United States Patent
Bang

(10) Patent No.: US 8,204,436 B2
(45) Date of Patent: Jun. 19, 2012

(54) APPARATUS AND METHOD FOR CONTROLLING BLUETOOTH IN PORTABLE TERMINAL

(75) Inventor: Hyo-Sik Bang, Sungnam-si (KR)

(73) Assignee: Samsung Electronics Co., Ltd. (KR)

( * ) Notice: Subject to any disclaimer, the term of this patent is extended or adjusted under 35 U.S.C. 154(b) by 945 days.

(21) Appl. No.: 11/856,554

(22) Filed: Sep. 17, 2007

(65) Prior Publication Data

US 2008/0070503 A1    Mar. 20, 2008

(30) Foreign Application Priority Data

Sep. 15, 2006 (KR) .................. 10-2006-0089455

(51) Int. Cl.
*H04B 7/00* (2006.01)
*H04M 1/66* (2006.01)
*H04M 1/68* (2006.01)
*H04M 3/16* (2006.01)

(52) U.S. Cl. ............... 455/41.2; 455/41.3; 455/411

(58) Field of Classification Search ........... 455/41.2, 455/41.3, 419, 410, 411, 412.1; 726/2
See application file for complete search history.

(56) References Cited

U.S. PATENT DOCUMENTS

| 7,076,269 B2 * | 7/2006 | Konishi et al. ............ 455/552.1 |
| 2004/0203601 A1 | 10/2004 | Morriss et al. |

FOREIGN PATENT DOCUMENTS

| FR | 2 814 900 | 4/2002 |
| GB | 2 340 975 | 3/2000 |
| WO | WO 01/20463 | 3/2001 |
| WO | WO 02/31778 | 4/2002 |

* cited by examiner

*Primary Examiner* — Eugene Yun
(74) *Attorney, Agent, or Firm* — The Farrell Law Firm, P.C.

(57) ABSTRACT

Provided are an apparatus and a method for controlling a Bluetooth in a portable terminal. The method includes receiving a Bluetooth connection request signal; determining whether a current state is a communicable state in which a Bluetooth control message can be received; if it is determined that the current state is the communicable state, determining whether a correct Bluetooth control message has been received and stored; and if it is determined that the correct Bluetooth control message has not been received and stored, establishing a connection of a Bluetooth communication.

16 Claims, 4 Drawing Sheets

APPARATUS AND METHOD FOR CONTROLLING BLUETOOTH IN PORTABLE TERMINAL

PRIORITY

This application claims priority under 35 U.S.C. §119 to an application filed in the Korean Intellectual Property Office on Sep. 15, 2006 and assigned Serial No. 2006-89455, the contents of which are incorporated herein by reference.

BACKGROUND OF THE INVENTION

1. Field of the Invention

The present invention relates generally to an apparatus and a method for controlling a Bluetooth® (hereinafter "Bluetooth") connection in a portable terminal, and in particular, to an apparatus and a method for controlling a Bluetooth connection according to a Bluetooth control message received from a remote place.

2. Description of the Related Art

Portable terminals such as mobile communication terminals, Personal Digital Assistants (PDAs), etc, are mainly used lately. Such portable terminals are used for simple telephone calls, schedule management, etc. Portable terminals are also used to take an image with a digital camera installed therein, view a satellite broadcast, edit a document, play a game, navigate, and form a link to a peripheral device using a Bluetooth connection to be provided with various services. Thus, the utility range of the portable terminal expands gradually.

In particular, the number of Bluetooth devices with Bluetooth modules increases with the development of Bluetooth communication technology. A Bluetooth device having a Bluetooth module generally searches for a peripheral Bluetooth device to wirelessly communicate with and then selects a searched peripheral Bluetooth device. If an authentication is required for communication between the Bluetooth device and the selected peripheral Bluetooth device, the Bluetooth device performs pairing to make a permission state of the communication with the selected peripheral Bluetooth device. Thus, the Bluetooth device starts communicating with the selected peripheral Bluetooth device in the permission state. Alternatively, the Bluetooth device may pre-store information for pairing with the selected peripheral Bluetooth device, and if the selected peripheral Bluetooth device, having the pre-stored information, requests for a Bluetooth connection through pairing, the Bluetooth device will automatically connect to the selected peripheral Bluetooth device.

A door lock system using a Bluetooth connection, as shown in FIG. 1, uses a Bluetooth connection method to automatically establish a Bluetooth connection in response to a Bluetooth connection request from a Bluetooth device that has pre-stored pairing information.

FIG. 1 illustrates a door lock system using portable terminals having Bluetooth modules according to the prior art.

Referring to FIG. 1, a Bluetooth lock 112 of a house 10 and a Bluetooth lock 142 of an automobile 140 periodically broadcast Bluetooth connection requests. When portable terminals 120 and 130, which have registered the Bluetooth locks 112 and 142, receive the Bluetooth connection requests, the portable terminals 120 and 130 automatically perform pairing processes to establish Bluetooth connections with the Bluetooth locks 112 and 142. If the Bluetooth connections are normally established, the Bluetooth locks 112 and 142 are unlocked.

A portable terminal having a Bluetooth module as illustrated FIG. 1 may be used as a key in a door lock system. Thus, if the portable terminal is lost, the door lock system may be useless due to a malicious user. If the portable terminal is lost as described above, a user must directly access a registered Bluetooth lock to separately initialize automatic Bluetooth connections. Thus, a security problem may occur, due to a delayed initialization. Also, if a plurality of Bluetooth locks is registered, it would be inconvenient to initialize the plurality of Bluetooth locks.

In addition, losing the portable terminal with the Bluetooth module may cause an outflow of security information, which is stored in a Bluetooth device connected to the portable terminal using a Bluetooth connection, even in an accessible condition.

Accordingly, an apparatus and a method, for controlling a Bluetooth connection of a portable terminal in a remote place, are required.

SUMMARY OF THE INVENTION

An aspect of the present invention is to substantially solve at least the above problems and/or disadvantages and to provide at least the advantages below. Accordingly, an aspect of the present invention is to provide an apparatus and a method for controlling a Bluetooth in a portable terminal.

Another aspect of the present invention is to provide an apparatus and a method for controlling a Bluetooth connection of a portable terminal in a remote place.

A further aspect of the present invention is to provide an apparatus and a method for controlling a Bluetooth connection of a portable terminal according to a Bluetooth control message received from a remote place.

According to one aspect of the present invention, there is provided a method of controlling a Bluetooth connection in a portable terminal, including receiving a Bluetooth connection request signal; determining whether a current state is a communicable state in which a Bluetooth control message can be received; if it is determined that the current state is the communicable state, determining whether a correct Bluetooth control message has been received and stored; and if it is determined that the correct Bluetooth control message has not been received and stored, establishing a connection of a Bluetooth communication.

According to another aspect of the present invention, there is provided an apparatus for controlling a Bluetooth connection in a portable terminal, including a communicator receiving a Bluetooth control message; a memory storing information regarding a registered Bluetooth device and a correct Bluetooth control message; a Bluetooth unit receiving a Bluetooth connection request signal from the registered Bluetooth device and providing a Bluetooth communication; and a controller determining whether the communicator is in a communicable state to receive the Bluetooth control message if the Bluetooth connection request signal is received, determining whether the memory has stored the correct Bluetooth control message if the communicator is in the communicable state, and controlling so as to connect to a Bluetooth communication through the Bluetooth unit if the memory has not stored the correct Bluetooth control message.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and a method for controlling a Bluetooth connection of a portable terminal according to a Bluetooth control message received from a remote place to prevent the portable terminal from being damaged by a loss thereof.

Figure 1:
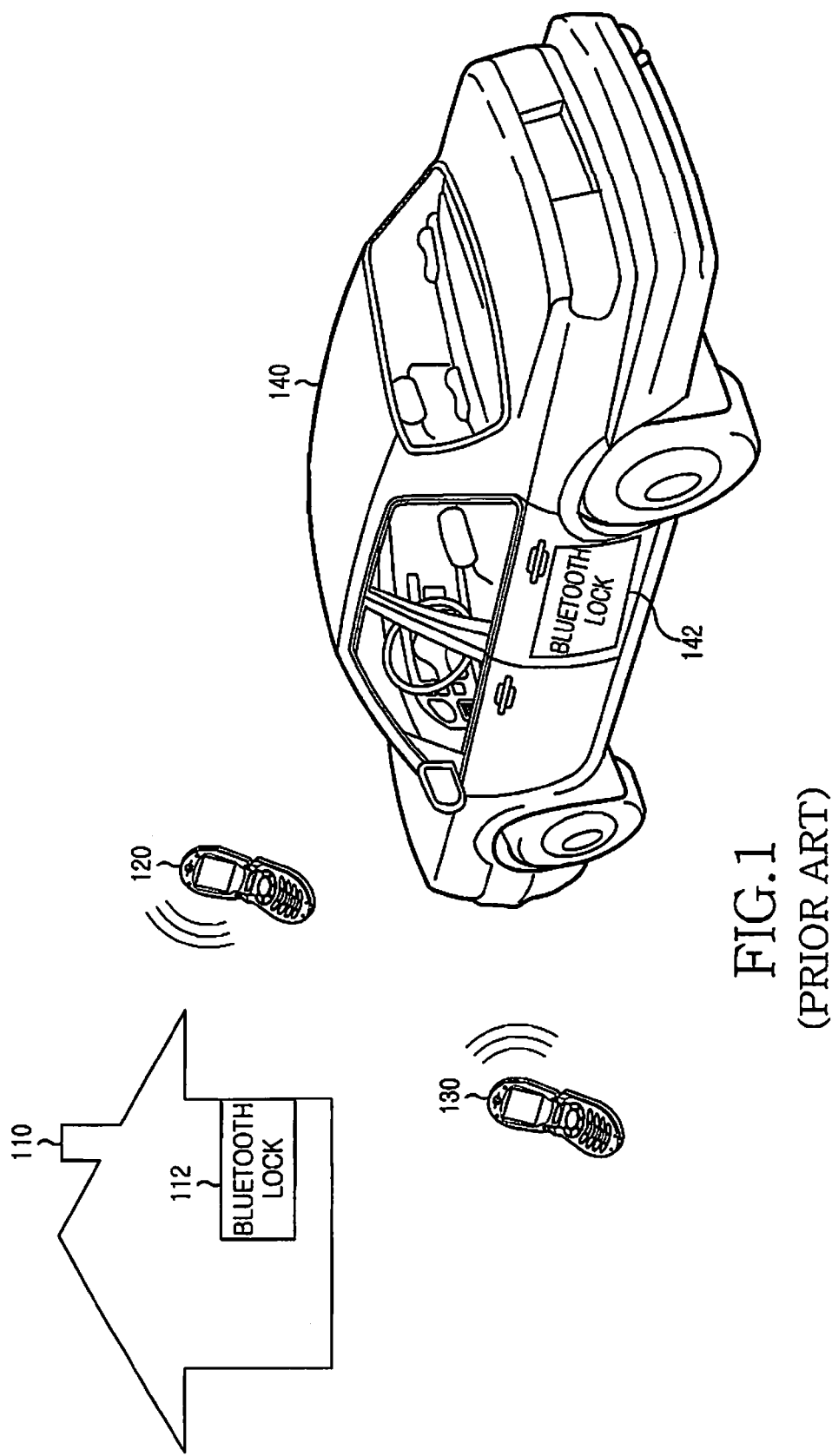
FIG. 1 illustrates a door lock system using portable terminals having Bluetooth modules according to the prior art.
Figure 2:
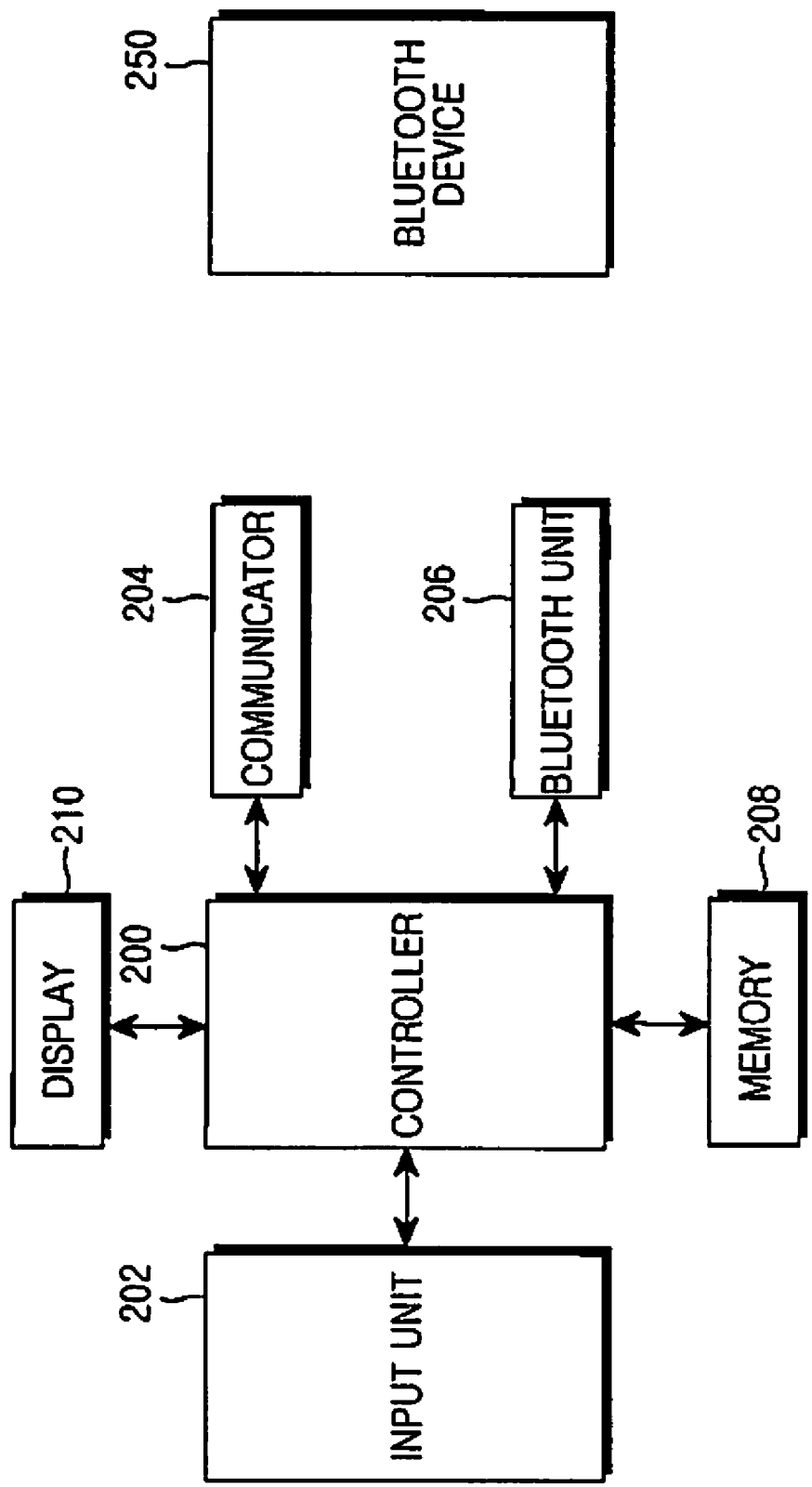
FIG. 2 is a block diagram of an apparatus for controlling a Bluetooth in a portable terminal according to the present invention.

FIG. 2 is a block diagram of an apparatus for controlling a Bluetooth in a portable terminal according to the present invention. Referring to FIG. 2, the portable terminal according to the present embodiment includes a controller 200, an input unit 202, a communicator 204, a Bluetooth unit 206, a memory 208, and a display 210.

The input unit 202 includes a plurality of keys or touch screens, recognizes an input from a user, and provides the input to the controller 200. According to the present invention, besides a normal function as described above, the input unit 202 receives an input of a Personal Identification Number (PIN) from the user and provides the input of the PIN to the controller 200 at a request for an input of the PIN.

The communicator 204 downconverts a Radio Frequency (RF) signal received through an antenna (not shown) to perform dispreading and channel decoding on the RF signal during receipt. The communicator 204 also performs channel coding and spreading on the RF signal, upconverts the RF signal, and transmits the RF signal through the antenna during transmitting. According to the present invention, the communicator 204 receives a Bluetooth control message and transmits a Bluetooth control completion message, in addition to normal functions as described above.

The controller 200 performs an overall operation of a Bluetooth communication and controls the Bluetooth unit 206. Here, the overall operation of the Bluetooth communication includes: searching for a Bluetooth device 250 to which the portable terminal is to be connected; and if an authentication is required for the Bluetooth communication between the portable terminal and the Bluetooth device 250, pairing to establish the Bluetooth communication between the portable terminal and the Bluetooth device 250. In an automatic Bluetooth connection mode, where a connection to an automatically connectable Bluetooth device is established, the Bluetooth unit 206 receives a Bluetooth connection request signal from the Bluetooth device 250, which has been previously registered, and establishes a Bluetooth connection with the Bluetooth device 250 under the control of the controller 200.

The memory 280 stores the PIN, Bluetooth control authentication information, and information regarding the Bluetooth connection with the registered Bluetooth device 250. The memory 280 is also controlled by the controller 200 to store a correct one of received Bluetooth control message.

The display 210 is controlled by the controller 200 to output a Bluetooth connection failure message, if the Bluetooth connection with the Bluetooth device 250 that requests the Bluetooth connection, fails. If the PIN is required, the display 210 outputs a PIN input request message. Also, if a Bluetooth control message that includes a disallowed control authentication number is received, the display 200 outputs a warning message.

When receiving a Bluetooth control message including an allowed control authentication number, the controller 200 controls such that the Bluetooth control message is stored in the memory 208. When receiving the Bluetooth connection request signal from the registered Bluetooth device 250 in the Bluetooth automatic connection mode, the controller 200 determines whether the communicator 204 is in a communicable state and whether the memory 208 stores the Bluetooth control message. If the communicator 204 is in the communicable state and the memory 208 does not store the Bluetooth control message, the controller 200 automatically connects to the registered Bluetooth device 250 through the Bluetooth unit 206. If the communicator 204 is not in the communicable state or if the communicator 204 is in the communicable state and the memory 208 stores the Bluetooth control message, a PIN is received. If the PIN is an allowed PIN, the controller 200 controls the Bluetooth unit 206 to establish the Bluetooth connection to the registered Bluetooth device 250.

The Bluetooth control message is generated and transmitted to the portable terminal to control the Bluetooth connection of the portable terminal in a remote location. For example, the Bluetooth control message may be expressed as "[010-123-4567]#LOCK[ab1323]," wherein "010-123-4567" is a phone number that identifies a portable terminal to be controlled, "#LOCK" is control information, and "ab1323" is control authentication information. In other words, the Bluetooth control message includes an IDentification (ID) number, control information, and a control authentication number of a portable terminal to be controlled.

Also, the Bluetooth control message may be transmitted as a Short Message Service (SMS) message or a Multimedia Message Service (MMS) message.

A method of controlling a Bluetooth in a portable terminal having a structure as described above will now be described with reference to FIGS. 3 and 4.

Figure 3:
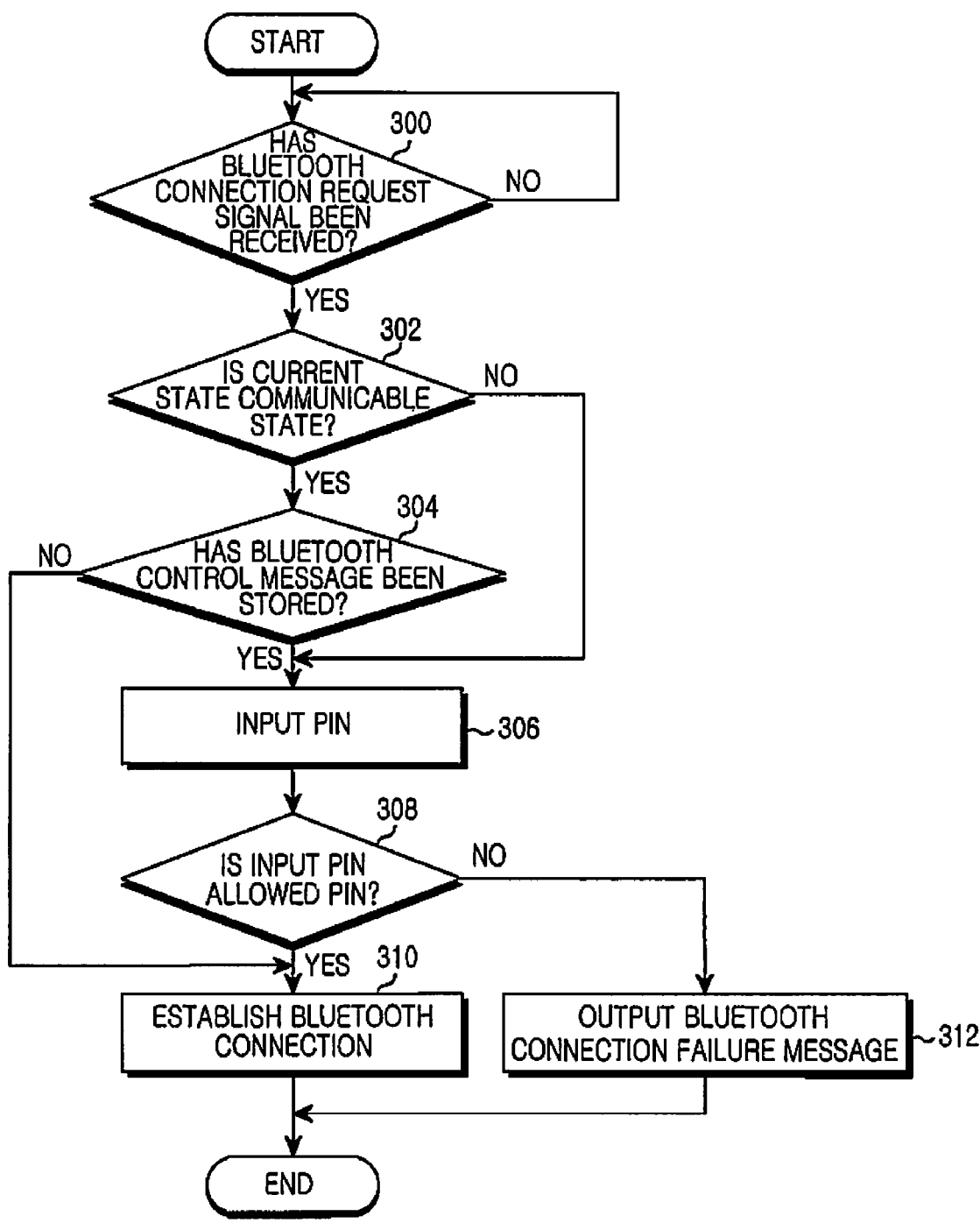
FIG. 3 is a flowchart of a process of establishing a Bluetooth connection of a portable terminal according to the present invention.

FIG. 3 is a flowchart of a process of establishing a Bluetooth connection of a portable terminal according to the present invention. Referring to FIG. 3, in step 300, the portable terminal, which is operating a Bluetooth automatic connection mode, determines whether a Bluetooth connection request signal has been received from a registered Bluetooth device. If it is determined in step 300 that the Bluetooth connection request signal has been received from the registered Bluetooth device, the portable terminal proceeds to step 302 to determine whether a current state is a communicable state in which the Bluetooth control message can be received.

If it is determined in step 302 that the current state is the communicable state, the portable terminal goes to step 304 to determine whether the memory 208 has stored the Bluetooth control message. If it is determined in step 304 that the memory 208 has not stored the Bluetooth control message, then the portable terminal proceeds to step 310 to establish a Bluetooth connection.

If it is determined in step 304 that the memory 208 has stored the Bluetooth control message, the portable terminal goes to step 306 to output a PIN input request message to the display 210 so as to receive a PIN from a user and then goes to step 308. In step 308, the portable terminal compares the received PIN with a PIN stored in the memory 208 to determine whether the received PIN is an allowed PIN. If it is determined in step 308 that the received PIN is the allowed PIN, the portable terminal goes to step 310 to establish the Bluetooth connection.

If it is determined in step 308 that the received PIN is not an allowed PIN, the portable terminal proceeds to step 312 to output to a Bluetooth connection failure message to the display 210.

If it is determined in step 302 that the current state is not the communicable state, the portable terminal goes to step 306.

Figure 4:
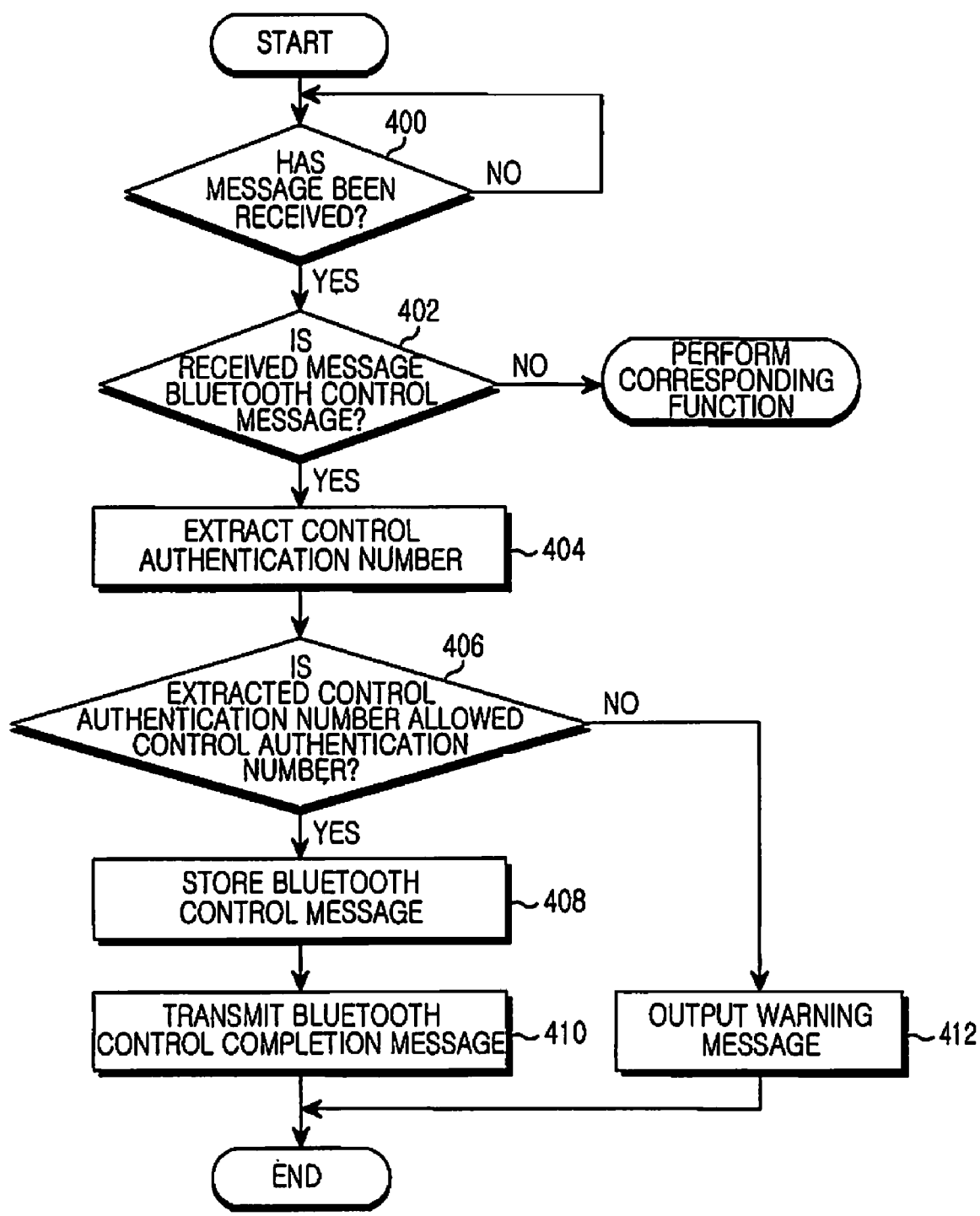
FIG. 4 is a flowchart of a process of receiving a Bluetooth control message in a portable terminal according to the present invention.

FIG. 4 is a flowchart of a process of receiving a Bluetooth control message in a portable terminal according to the present invention.

Referring to FIG. 4, in step 400, the portable terminal according to the present embodiment determines whether a message has been received. If it is determined in step 400 that the message has been received, the portable terminal proceeds to step 402 to determine whether the received message is a Bluetooth control message. If it is determined in step 402 that the received message is not the Bluetooth control message, the portable terminal performs a corresponding function.

If it is determined in step 402 that the received message is the Bluetooth control message, the portable terminal proceeds to step 404 to extract a control authentication number from the Bluetooth control message and then goes to step 406. In step 406, the portable terminal determines whether the extracted control authentication number is an allowed control authentication number, i.e., whether the extracted control authentication number is equal to a control authentication number stored in the memory 208.

If it is determined in step 406 that the extracted control authentication number is the allowed control authentication number, the portable terminal proceeds to step 408 to store the Bluetooth control message in the memory 208 without outputting information regarding the reception of the Bluetooth control message to the display 210 and then goes to step 410. In step 410, the portable terminal generates and transmits a Bluetooth control completion message about a completion of the control of the Bluetooth connection to a remote place that has transmitted the Bluetooth control message.

If it is determined in step 406 that the extracted control authentication number is a disallowed control authentication number, the portable terminal goes to step 412 to output a warning message about a reception of a Bluetooth control message including the disallowed control authentication number to the display 210.

As described above, in an apparatus and a method for controlling a Bluetooth in a portable terminal according to the present invention, a Bluetooth connection can be controlled according to a Bluetooth control message received from a remote place. As a result, a security problem caused by a loss of a portable terminal having a Bluetooth module can be solved.

Alternate embodiments of the present invention can also comprise computer readable codes on a computer readable medium. The computer readable medium includes any data storage device that can store data that can be read by a computer system. Examples of a computer readable medium include magnetic storage media (such as Read Only Memory (ROM), floppy disks, and hard disks, among others), optical recording media (such as Compact Disk (CD)-ROMs or Digital Versatile Disks (DVDs)), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of controlling a Bluetooth module in a portable terminal, the method comprising:
   receiving a Bluetooth connection request signal;
   determining whether a correct Bluetooth control message has been received from a remote location and stored;
   if it is determined that the correct Bluetooth control message has not been received and stored, establishing a connection of a Bluetooth communication; and
   if it is determined that the correct Bluetooth control message has been received and stored:
      receiving authentication information from a user,
      comparing the received authentication information with a stored control authentication information, and
      if the received authentication information is the same as the stored control authentication information, establishing the connection of the Bluetooth communication.

2. The method of claim 1, further comprising: if a received PIN is not the same as a stored PIN, controlling so as not to connect to establish the Bluetooth communication.

3. The method of claim 1, further comprising:
   if it is determined that the Bluetooth control message has been received, extracting received control authentication information from the Bluetooth control message;
   comparing the received control authentication information with stored control authentication information; and
   if the received control authentication information is the same as the stored control authentication information, storing the Bluetooth control message as the correct Bluetooth control message.

4. The method of claim 3, further comprising if the received control authentication information is the same as the stored control authentication information, generating and transmitting a Bluetooth control completion message as a response message to a remote place which has transmitted the Bluetooth control message.

5. The method of claim 3, further comprising if the received control authentication information is not the same as the stored control authentication information, outputting a warning message about a reception of an incorrect Bluetooth control message.

6. The method of claim 1, wherein the Bluetooth control message comprises an IDentification (ID) number, control information, and a control authentication number of the portable terminal to be controlled.

7. An apparatus for controlling a Bluetooth module in a portable terminal, the apparatus comprising:
   a communicator receiving a Bluetooth control message from a remote location;
   a memory storing information regarding a registered Bluetooth device and a correct Bluetooth control message;
   a Bluetooth unit receiving a Bluetooth connection request signal from the registered Bluetooth device and providing a Bluetooth communication;

a controller controlling so as to establish connection of the Bluetooth communication through the Bluetooth unit if the memory has not stored the correct Bluetooth control message; and an input unit through which a user enters authentication information, wherein the memory stores a control authentication information and, if the memory has stored the correct Bluetooth control message, the controller controls a connection to the Bluetooth communication through the Bluetooth unit when receiving authentication information and the received authentication information is the same as the control authentication information stored in the memory.

8. The apparatus of claim 7, wherein if the memory has stored the correct Bluetooth control message, the controller controls so as not to connect to establish the Bluetooth communication.

9. The apparatus of claim 7, wherein if a received PIN is not the same as a stored PIN, the controller controls so as not to connect to the Bluetooth communication.

10. The apparatus of claim 7, wherein:

the controller compares received control authentication information of the Bluetooth control message with the control authentication information stored in the memory if the Bluetooth control message is received through the communicator, and controls such that the Bluetooth control message is stored as the correct Bluetooth control message in the memory if the received control authentication information is the same as the stored control authentication information.

11. The apparatus of claim 10, wherein if the received control authentication information is the same as the stored control authentication information, the controller controls such that a Bluetooth control completion message is generated and transmitted as a response message to the remote location which has transmitted the Bluetooth control message.

12. The apparatus of claim 10, further comprising a display outputting a warning message about reception of the correct Bluetooth control message, wherein if the received control authentication information is not the same as the stored control authentication information, the controller controls such that the warning message is output to the display.

13. The apparatus of claim 7, wherein the Bluetooth control message comprises an ID number, control information, and a control authentication number of the portable terminal to be controlled.

14. An apparatus for controlling a Bluetooth module in a portable terminal, comprising:

means for receiving a Bluetooth connection request signal;

means for determining whether a current state is a communicable state in which a Bluetooth control message can be received;

means for determining whether a correct Bluetooth control message has been received from a remote location and stored;

means for, if the correct Bluetooth control message has not been received and stored, establishing a connection of a Bluetooth communication; and means for, if the correct Bluetooth control message has been received and stored:

receiving authentication information from a user, comparing the received authentication information with a stored control authentication information, and if the received authentication information is the same as the stored control authentication information, establishing the connection of the Bluetooth communication.

15. The apparatus of claim 14, further comprising:

means for receiving the Bluetooth control message;

means for extracting received control authentication information from the Bluetooth control message;

means for comparing the received control authentication information with stored control authentication information; and means for storing the Bluetooth control message as the correct Bluetooth control message.

16. A non-transitory computer-readable recording medium having recorded thereon a program for controlling a Bluetooth module in a portable terminal, the computer-readable recording medium comprising:

a first code segment, receiving from a Bluetooth unit a Bluetooth connection request signal;

a second code segment, determining whether a current state is a communicable state in which a Bluetooth control message can be received;

a third code segment, determining whether a correct Bluetooth control message has been received from a remote location and stored;

a fourth code segment, if the correct Bluetooth control message has not been received and stored, establishing a connection of a Bluetooth communication; and a fifth code segment for, if the correct Bluetooth control message has been received and stored:

receiving authentication information from a user, comparing the received authentication information with a stored control authentication information, and if the received authentication information is the same as the stored control authentication information, establishing the connection of the Bluetooth communication.

* * * * *